United States Patent
Davis

(10) Patent No.: US 7,818,537 B2
(45) Date of Patent: Oct. 19, 2010

(54) METHOD AND SYSTEM FOR DYNAMICALLY DETERMINING HASH FUNCTION VALUES FOR FILE TRANSFER INTEGRITY VALIDATION

(75) Inventor: Brent Edward Davis, Louisville, CO (US)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 11/779,956

(22) Filed: Jul. 19, 2007

(65) Prior Publication Data

US 2009/0024827 A1 Jan. 22, 2009

(51) Int. Cl.
G06F 9/26 (2006.01)
G06F 12/00 (2006.01)
(52) U.S. Cl. ............................... 711/216; 711/E12.018
(58) Field of Classification Search ................. 711/216, 711/E12.018
See application file for complete search history.

(56) References Cited

U.S. PATENT DOCUMENTS

| | | | |
|---|---|---|---|
| 6,493,871 B1 | 12/2002 | McGuire et al. | |
| 7,340,602 B2 * | 3/2008 | Serret-Avila | 713/161 |
| 7,500,099 B1 * | 3/2009 | McElwee et al. | 713/168 |
| 2003/0105888 A1 | 6/2003 | Connelly et al. | |
| 2004/0181687 A1 | 9/2004 | Nachenberg et al. | |
| 2007/0250521 A1 * | 10/2007 | Kaminski | 707/101 |
| 2008/0270436 A1 * | 10/2008 | Fineberg et al. | 707/101 |

\* cited by examiner

*Primary Examiner*—Mardochee Chery
(74) *Attorney, Agent, or Firm*—Schmeiser, Olsen & Watts; Arthur J. Samodovitz

(57) ABSTRACT

A method and system for dynamically determining hash values for file transfer integrity validation. In response to a request for a transfer of a data file between a first computing system and a second computing system, the first computing system loads a first portion of the data file to a buffer. The first computing system determines a first hash function value based on the first portion. The first computing system loads a second portion of the data file portion to the buffer and determines a second hash function value incrementally based on the first and second data file portions. The first and second data file portions are non-overlapping portions of the data file being transferred.

20 Claims, 7 Drawing Sheets

| ITERATION NUMBER | FILE TRANSFER BUFFER CONTENTS | CUMULATIVE HASH VALUE (CRC32) |
| --- | --- | --- |
| 1 | "The quick br" | 1663016112 |
| 2 | "own fox jump" | 2388230324 |
| 3 | "s over the l" | 1868246359 |
| 4 | "azy dog" | 1095738169 |

METHOD AND SYSTEM FOR DYNAMICALLY DETERMINING HASH FUNCTION VALUES FOR FILE TRANSFER INTEGRITY VALIDATION

FIELD OF THE INVENTION

The present invention relates to a method and system for dynamically determining hash function values for file transfer integrity validation.

BACKGROUND OF THE INVENTION

Hash functions are used to validate the integrity of files transferred over a computer network (e.g., the Internet or an internal company network). Hash function values, such as checksums, are computed by both the file sender and the file receiver. These hash function values are then compared for equality to validate that no transmission errors occurred during the transfer. Known hash functions used for file integrity checking include the 32-bit Cyclic Redundancy Check (CRC32) and Message Digest algorithm 5 (MD5). In conventional client-server based file transfer operations, the file integrity checking process includes a transfer of a file and calculations of hash function values by both the client and the server. The transfer of the file includes input/output processing at both the client and the server (e.g., the server fetches a file to be downloaded to the client and the client stores the downloaded file). The calculations of the hash function values include additional input/output processing of the file (i.e., fetching the server copy of the file and fetching the client copy of the file). Therefore, using the conventional approach, the data for the transferred file is subject to input/output processing twice on each side of the transfer: once during the file transfer operation and then again during the hash function value calculation. As the size of transferred files increases to certain levels, the computing resources and elapsed time required to perform the file integrity check function increases to very expensive and inefficient levels. Thus, there exists a need to overcome at least one of the preceding deficiencies and limitations of the related art.

SUMMARY OF THE INVENTION

The present invention provides a computer-implemented method of dynamically determining hash values for file transfer integrity validation. A first computing system loads a first portion of a data file to a file transfer buffer of the first computing system. Loading the first portion is performed in response to a request for a transfer of the data file between the first computing system and a second computing system. In response to loading the first portion, the first computing system determines a first hash function value based on the first portion. Also in response to the request for the transfer of the data file, the first computing system loads a second portion of the data file to the file transfer buffer. In response to loading the second portion, the first computing system determines a second hash function value incrementally based on the first portion and the second portion. The first portion and the second portion are a pair of non-overlapping portions included in multiple non-overlapping portions that comprise the data file.

A system and computer program product corresponding to the above-summarized method are also described and claimed herein.

Advantageously, the present invention provides a dynamic hash function value determination technique that reduces input/output processing and that does not require any change in existing file transfer protocols utilized by the sending and receiving computing systems. By reducing input/output processing, the present invention reduces computer resource requirements and significantly reduces elapsed times for file integrity validation.

BRIEF DESCRIPTION OF THE DRAWINGS

FIG. 4 is an example of changes in the contents of a file transfer buffer as a result of the process of FIG. 2, in accordance with embodiments of the present invention.

DETAILED DESCRIPTION OF THE INVENTION

1 Overview

The present invention provides a file integrity validation technique for performing hash function value computations during a file transfer operation, rather than in a separate hash function value computation step, thereby eliminating the need to fetch and process the file data twice on the sending computing system side of the transfer and twice on the receiving computing system side of the transfer. The hash function value is computed incrementally on the fly, as data buffers are processed during the file transfer, and then stored in session or persistent storage to be subsequently retrieved and used when needed. The present invention allows input/output processing to be halved, thereby reducing computing resource requirements and significantly reducing elapsed times for file integrity validation. Herein, a hash function value is also referred to as a hash value.

2 System for Dynamic Determination of Hash Values

Figure 1A:
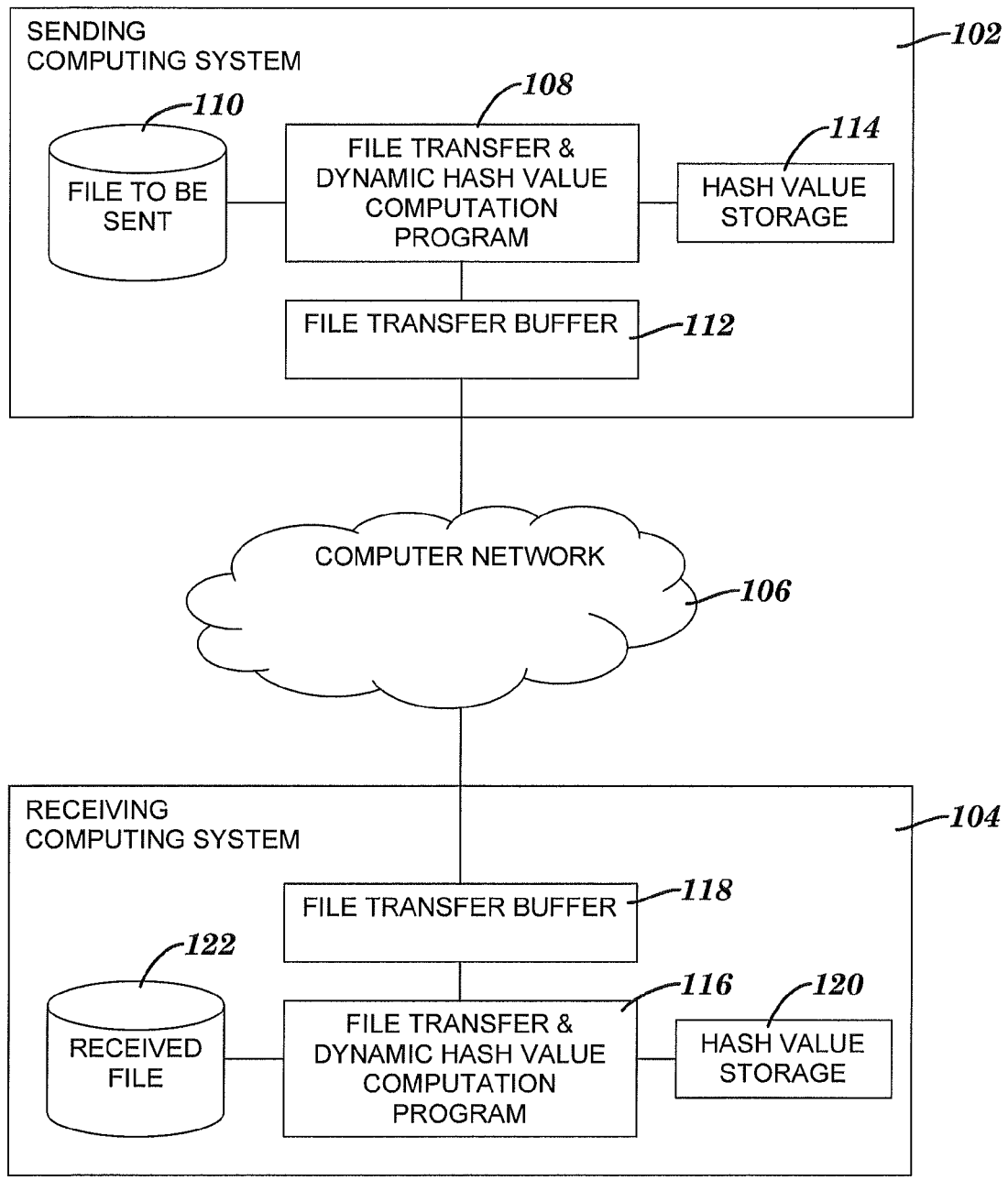
FIGS. 1A-1C are a block diagrams of systems for dynamically determining hash values for file transfer integrity validation, in accordance with embodiments of the present invention.

FIG. 1A is a block diagram of a system in a first embodiment for dynamically determining hash values for file transfer integrity validation. System 100 includes a sending computing system 102 and a receiving computing system 104 in communication via computer network 106. Sending computing system 102 includes a file transfer and dynamic hash value computation program 108, a computer file 110 to be sent to receiving computing system 104, a file transfer buffer 112 and a hash value storage 114. Hash value storage 114 is either a persistent (i.e., non-volatile) data storage (i.e., data repository; e.g., magnetic disk) or session (i.e., non-persistent or volatile) storage (e.g., random access memory). File transfer and dynamic hash value computation program 108 sends file 110 in portions to file transfer buffer 112, dynamically updates a hash function value as contents of (i.e., data included in) file transfer buffer 112 are processed by program 108 and stores each updated hash function value in hash value storage 114. The functionality of program 108 is described in more detail below relative to FIG. 2.

Each portion of file 110 that is sent to file transfer buffer 112 is sent to receiving computing system 104 via computer network 106. Receiving computing system 104 includes a file transfer and dynamic hash value computation program 116, a file transfer buffer 118, a hash value storage area 120 and a received computer file 122. Hash value storage 120 is persistent or session storage. The contents of file transfer buffer 112 that are sent via computer network 106 are received by file transfer buffer 118. File transfer and dynamic hash value computation program 116 stores the contents of file transfer buffer 118 in received file 122, dynamically updates a hash function value as contents of file transfer buffer 118 are processed by program 116 and stores each updated hash function value in hash value storage 120. The functionality of program 116 is described in more detail below relative to FIG. 2.

Figure 1B:
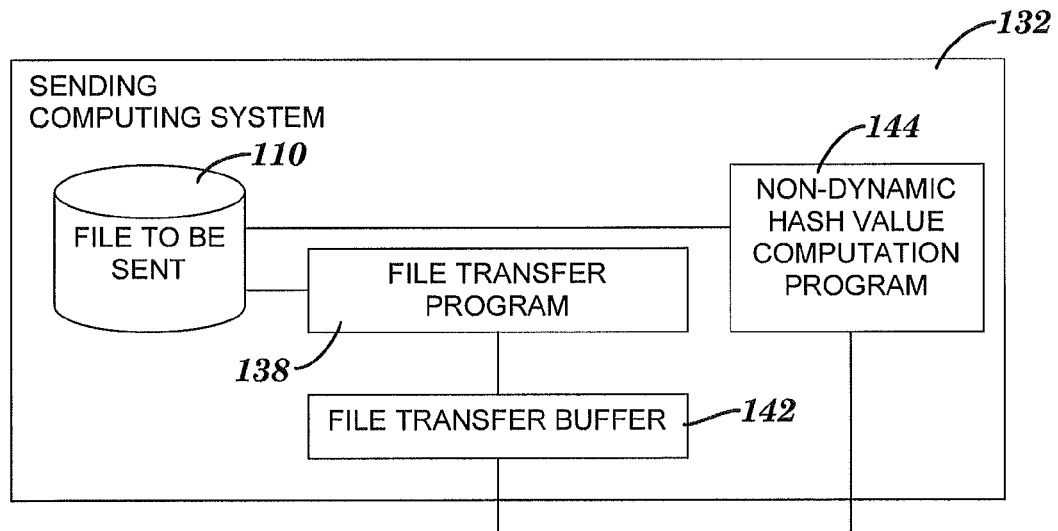
Figure 1B:
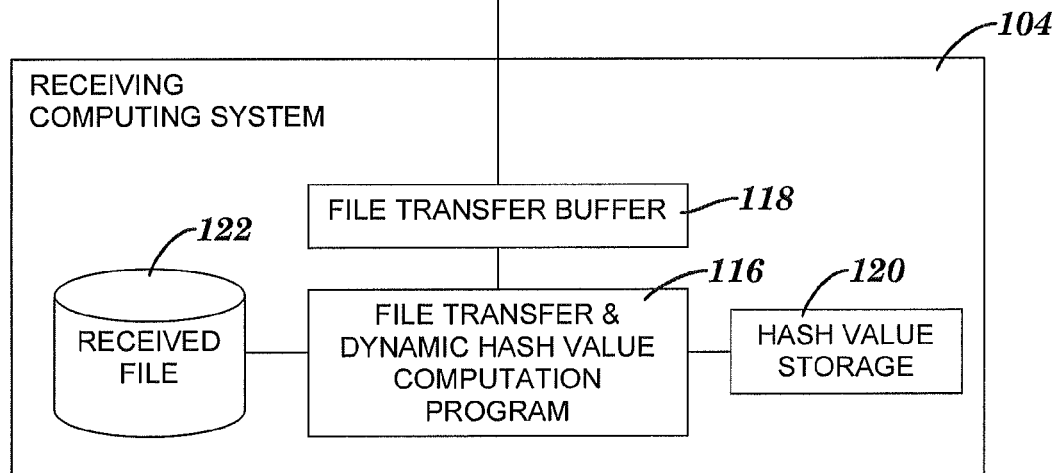

FIG. 1B is a block diagram of a system in a second embodiment for dynamically determining hash values for file transfer integrity validation. Similar to system 100 of FIG. 1A, system 130 includes receiving computing system 104 that includes file transfer and dynamic hash value computation program 116, file transfer buffer 118, hash value storage 120 and received file 122. System 130 also includes a sending computing system 132 that includes file to be sent 110, a file transfer program 138, a file transfer buffer 142, and a non-dynamic hash value computation program 144. Again, the functionality of program 116 is described in more detail below relative to FIG. 2.

File 110 is sent by file transfer program 138 via file transfer buffer 142 and computer network 106 to receiving computing system, where the contents of file transfer buffer 142 are received, processed and stored, and the hash value function value for the received contents is dynamically updated as described above relative to FIG. 1A. Unlike system 100 of FIG. 1A, sending computing system 132 uses a conventional technique provided by program 144 to determine a hash function value of file 110 and sends the hash function value to receiving computing system 104 via computer network 106.

Figure 1C:
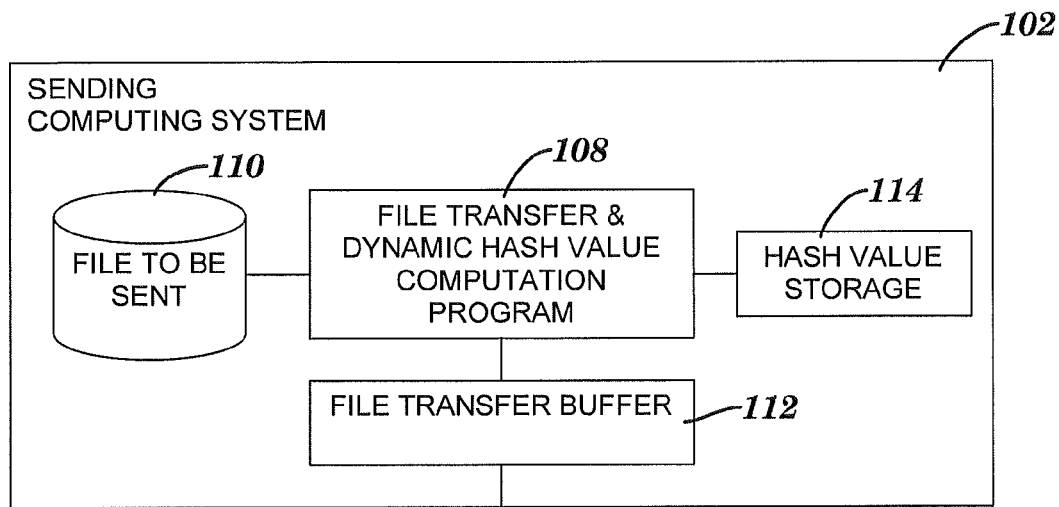
Figure 1C:
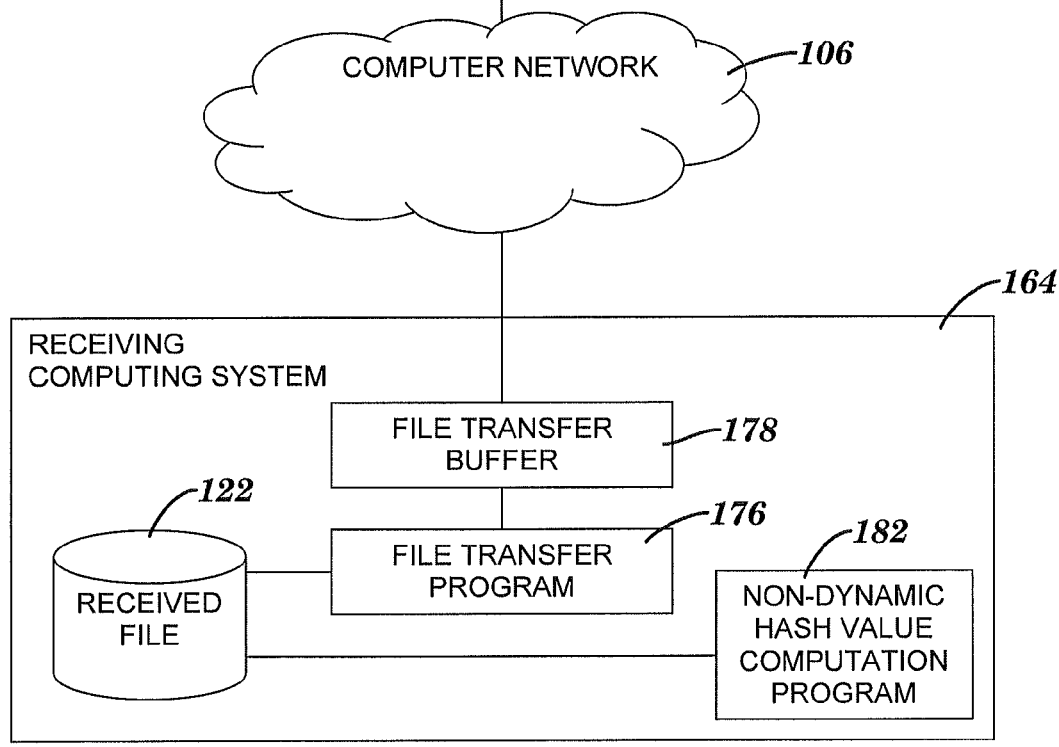

FIG. 1C is a block diagram of a system in a third embodiment for dynamically determining hash values for file transfer integrity validation. Similar to system 100 of FIG. 1A, system 160 includes sending computing system 102 that includes file transfer and dynamic hash value computation program 108, file transfer buffer 112, hash value storage 114 and file to be sent 110. Again, the functionality of program 108 is described in more detail below relative to FIG. 2. System 160 also includes a receiving computing system 164 that includes a file transfer program 176, a file transfer buffer 178, a non-dynamic hash value computation program 182 and received file 122.

File 110 in system 160 is processed and sent via file transfer buffer 112 and a hash value for the contents of buffer 112 is dynamically updated as described above relative to FIG. 1A. As the data of buffer 112 is sent via computer network 106, file transfer buffer 178 receives the data. Receiving computing system 164 also receives the hash function value from hash value storage 114. File transfer program 176 processes the contents of file transfer buffer 178 and stores those contents in received file 122. Unlike system 100 of FIG. 1A, receiving computing system 164 uses a conventional technique provided by program 182 to determine a hash function value of received file 122.

3 Dynamically Determining Hash Values

Figure 2:
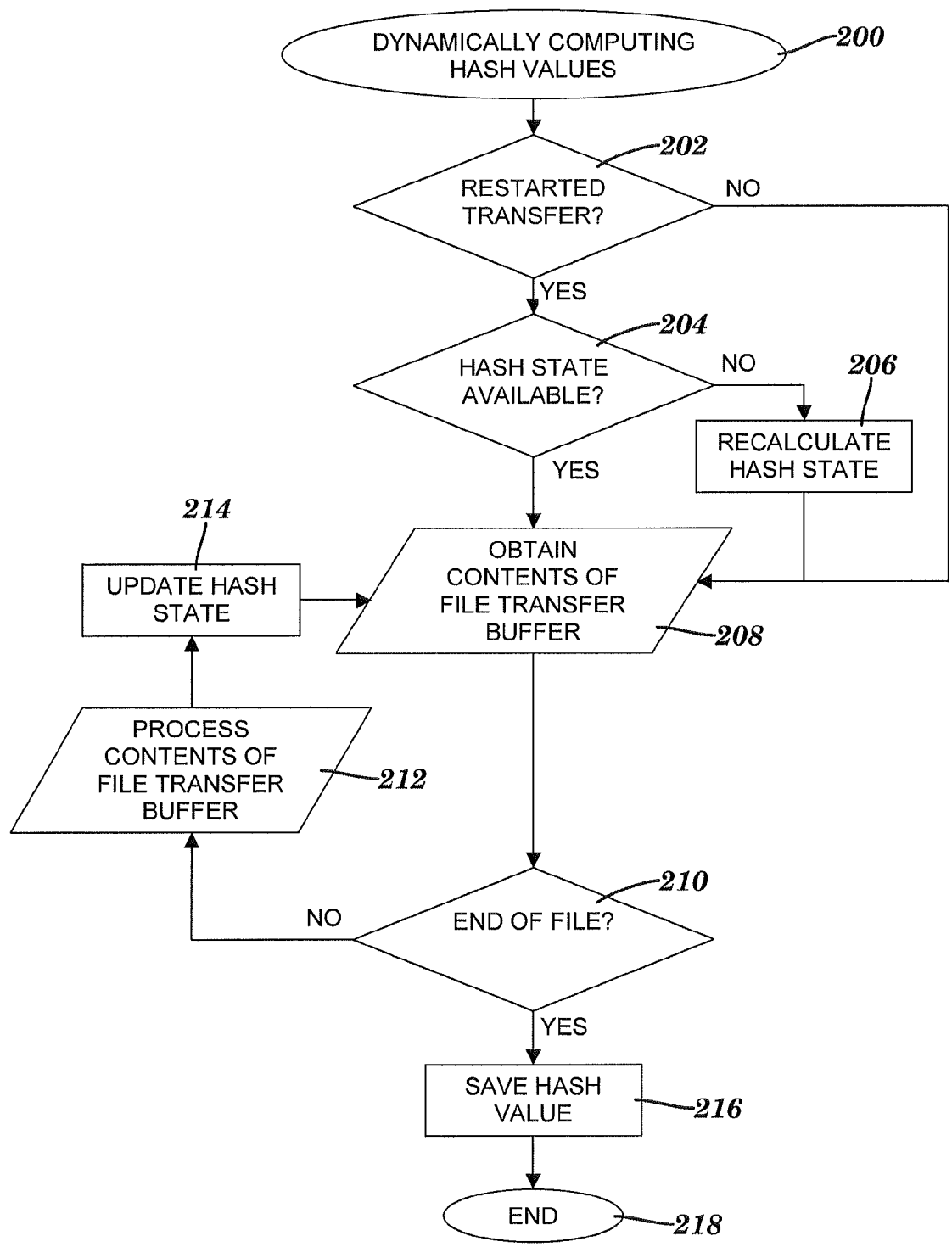
FIG. 2 is a flow diagram of a process for dynamically determining hash values for file transfer integrity validation, where the process is implemented by the system of FIG. 1A, 1B or 1C, in accordance with embodiments of the present invention.

FIG. 2 is a flow diagram of a process for dynamically determining hash values for file transfer integrity validation, where the process is implemented by the system of FIG. 1A, 1B or 1C, in accordance with embodiments of the present invention. Unless otherwise noted, Sections 3.1 and 3.2 describe the process of FIG. 2 relative to components of system 100 of FIG. 1A, such as sending computing system 102, receiving computing system 104, computer network 106, file transfer and dynamic hash value computation program 108, file 110, file transfer buffer 112, hash value storage 114, file transfer and dynamic hash value computation program 116, file transfer buffer 118 and hash value storage 120.

3.1 Dynamically Determining Hash Values by the Sending Computer

The process of dynamically determining hash values by sending computing system 102 starts at step 200. In step 202, file transfer and dynamic hash value computation program 108 determines whether or not a transfer of file 110 is being restarted following an interruption of the file transfer process. An interruption of the file transfer process is an interruption of a communication session between sending computing system 102 and receiving computing system 104 and includes, for example, a failure of computer network 106, sending computing system 102 or receiving computing system 104. Determining that the transfer of file 110 is being restarted is also referred to herein as determining a restart state.

If the file transfer is being restarted as determined by step 202, then the hash function value for the restart state must be obtained by file transfer and dynamic hash value computation program 108. In step 204, program 108 determines whether or not a previously stored hash state for the restart state is available. In other words, program 108 determines if the hash function value for the part of file 110 transferred up to the time of the restart is stored in persistent storage (i.e., hash value storage 114 is persistent storage and includes the hash state of the restart state). If the hash state is not available, then in step 206 sending computing system 102 uses a conventional hash function technique to recalculate the hash function value for the part of file 110 transferred up to the time of the restart. Program 108 also stores the hash function value recalculated in step 206 in hash value storage 114.

Step 208 follows step 206, a determination in step 204 that the hash state is available in persistent storage, or a determination in step 202 that the file transfer process is not in a restart state. In step 208, file transfer and dynamic hash value computation program 108 obtains (i.e., fetches) a portion of file 110 from storage and loads the obtained portion to file transfer buffer 112 (i.e., the obtained portion becomes the contents of file transfer buffer 112). For example, in step 208 sending computing system 102 reads a portion of file 110 from disk and loads the read portion of file 110 to file transfer buffer 112.

As described below, step 208 is part of a loop executed multiple times in the hash value computation process of FIG. 2. All portions of file 110 obtained by the multiple executions of step 208 are non-overlapping portions of file 110 (i.e., discrete, consecutive portions of the file being transferred).

In step 210, file transfer and dynamic hash value computation program 108 determines whether the end of file 110 has been reached or whether an abnormal termination of the file transfer has occurred and there is no more data. Program 108 determines that the end of file 110 has been reached in step 210 by determining that the contents of file transfer buffer 112 indicate the end of file 110. If program 108 does not detect the end of file 110 or an abnormal file transfer termination in step 210, then in step 212 program 108 processes the file transfer buffer contents obtained in step 208. Processing the file transfer buffer contents in step 212 includes program 108 transmitting the contents of file transfer buffer 112 to receiving computing system 104.

In step 214, file transfer and dynamic hash value computation program 108 updates the hash state using the contents of file transfer buffer 112. That is, program 108 determines the hash function value for the accumulation of all portions of file 110 transferred so far by the process of FIG. 2, including the portion most recently processed in step 212. The hash function value may be determined in step 214 by any hash function that allows the hash function value to be computed incrementally. File transfer buffer 112 receives the next portion of file 110 being transferred by program 108. The process repeats starting at step 208, with program 108 fetching the next portion of file 110 from storage and loading this fetched next portion into file transfer buffer 112.

Step 214 computes the hash function value incrementally in each execution of the loop that includes steps 208, 210, 212 and 214 until a final hash function value is determined as described below. That is, performing step 214 in each execution of the aforementioned loop updates a running (a.k.a. cumulative) hash function value based on non-overlapping portions (i.e., discrete, consecutive portions) of the data file 110 already processed by the one or more previous executions of step 212 (i.e., already processed by the execution of step 212 in the current execution of the aforementioned loop of steps 208, 210, 212 and 214 and in any previous executions of the loop).

If file transfer and dynamic hash value computation program 108 detects the end of file 110 in step 210, then in step 216 program 108 saves the final hash function value determined in step 214 to hash value storage 114. The process of dynamically determining hash values ends at step 218.

3.2 Dynamically Determining Hash Values by the Receiving Computer

The process of FIG. 2 also applies to a dynamic determination of hash values by receiving computing system 104. The process of dynamically determining hash values by receiving computing system 104 starts at step 200. In step 202, file transfer and dynamic hash value computation program 116 determines whether or not the transfer of file 110 is in a restart state following an interruption of the file transfer process (i.e., an interruption of a communication session between sending computing system 102 and receiving computing system 104).

If the file transfer is being restarted as determined by step 202, then the hash function value for the restart state must be obtained by file transfer and dynamic hash value computation program 116. In step 204, program 116 determines whether or not a previously stored hash state for the restart state is available. In other words, program 116 determines if the hash function value for the part of file 110 received via computer network 106 up to the time of the restart is stored in persistent storage (i.e., hash value storage 120 is persistent storage and includes the hash state of the restart state). If the hash state is not available, then in step 206 receiving computing system 104 uses a conventional hash function technique to recalculate the hash function value for the part of file 110 received via computer network 106 up to the time of the restart. Program 116 also stores the hash function value recalculated in step 206 in hash value storage 120.

Step 208 follows step 206, a determination in step 204 that the hash state is available in persistent storage, or a determination in step 202 that the file transfer process is not in a restart state. In step 208, receiving computing system 104 obtains a portion of file 110 from computer network 106 and loads the obtained portion to file transfer buffer 118 (i.e., the obtained portion becomes the contents of file transfer buffer 118).

In step 210, file transfer and dynamic hash value computation program 116 determines whether the end of file 110 has been reached or whether an abnormal termination of the file transfer has occurred and there is no more data. Program 116 determines that the end of file 110 has been reached in step 210 by determining that the contents of file transfer buffer 118 indicate the end of file 110. If program 116 does not detect the end of file 110 or an abnormal file transfer termination in step 210, then in step 212 program 116 processes the file transfer buffer contents obtained in step 208. Processing the file transfer buffer contents in step 212 includes program 116 writing the contents of file transfer buffer 118 to a persistent storage device (e.g., disk).

In step 214, file transfer and dynamic hash value computation program 116 updates the hash state using the contents of file transfer buffer 118. That is, program 116 determines the hash function value for the accumulation of all portions of file 110 received so far by receiving computing system 104 in the process of FIG. 2, including the portion most recently processed in step 212. Again, the hash function value may be determined in step 214 by any hash function that allows the hash function value to be computed incrementally. The hash value computation process repeats starting at step 208, with receiving computing system 104 obtaining the next portion of file 110 from computer network 106 and loading this obtained next portion into file transfer buffer 118.

Step 214 computes the hash function value incrementally in each execution of the loop that includes steps 208, 210, 212 and 214 until a final hash function value is determined as described below. That is, performing step 214 in each execution of the aforementioned loop updates a running (a.k.a. cumulative) hash function value based on non-overlapping portions of data file 110 already processed by the one or more previous executions of step 212 (i.e., already processed by the execution of step 212 in the current execution of the aforementioned loop of steps 208, 210, 212 and 214 and in any previous executions of the loop).

If file transfer and dynamic hash value computation program 116 detects the end of file 110 in step 210, then in step 216 program 116 saves the final hash function value determined in step 214 to hash value storage 120. The process of dynamically determining hash values ends at step 218.

3.3 Dynamically Determining Hash Values in Alternate Embodiments

The dynamic hash value determination process described above in Section 3.1 is also implemented by sending computing system 102 of system 160 in FIG. 1C. The dynamic hash value determination process described above in Section 3.2 is also implemented by receiving computing system 104 of system 130 in FIG. 1B.

4 Retrieving Hash Function Values

Figure 3:
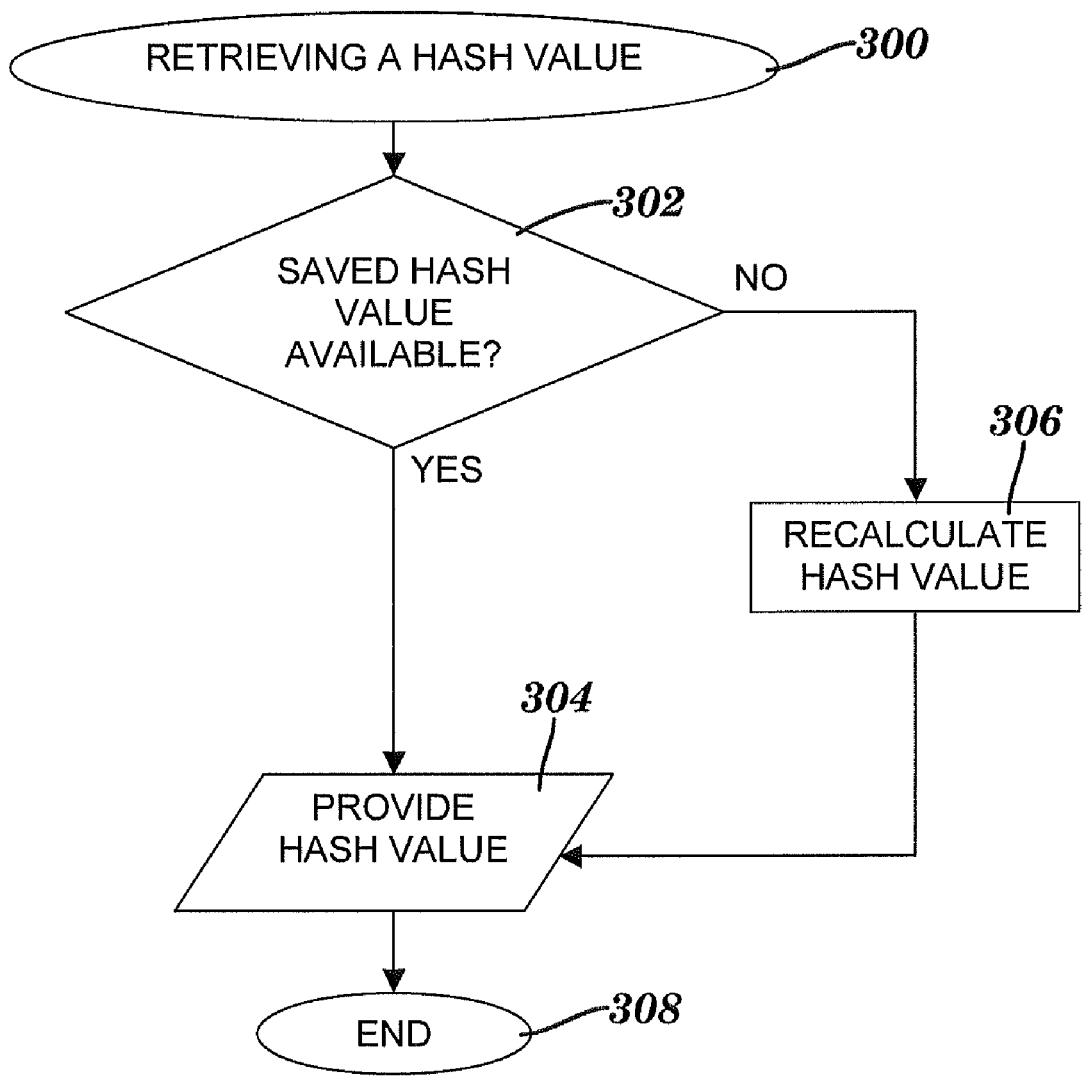
FIG. 3 is a flow diagram of retrieving a hash function value determined by the process of FIG. 2, in accordance with embodiments of the present invention.

FIG. 3 is a flow diagram of retrieving a hash function value determined by the process of FIG. 2, in accordance with embodiments of the present invention. The retrieval process described in this section may apply to any of the systems presented in FIG. 1A, 1B or 1C; however, for simplicity, only system 100 of FIG. 1A will be referenced for the remainder of this section. Further, this section references a client computing system (a.k.a. client) and a server computing system (a.k.a. server). In this section, either the client is sending computing system 102 (see FIG. 1A) and the server is receiving computing system 104 (see FIG. 1A), or the client is receiving computing system 104 (see FIG. 1A) and the server is sending computing system 102 (see FIG. 1A).

The hash function value retrieval process begins at step 300. In step 302, the client requests a hash function value from the server and the client determines if the requested hash function value is available in session or persistent storage. That is, the client determines if the requested hash function value is saved in hash value storage 114 (see FIG. 1A) if the server is sending computing system 102 (see FIG. 1A) or in hash value storage 120 (see FIG. 1A) if the server is receiving computing system 104 (see FIG. 1A). Thus, the client is determining in step 302 whether the requested hash function value is saved via step 216 of FIG. 2.

If step 302 determines that the requested hash function value is available in session or persistent storage, then in step 304 the server retrieves the requested hash function value from the session or persistent storage and provides the requested hash function value to the client.

If step 302 determines that the requested hash function value is not available in session or persistent storage, then in step 306, the server recalculates the requested hash function value using a conventional technique. Following step 306, the server provides the requested hash function value to the client in step 304.

Following step 304, the retrieval process of FIG. 3 ends at step 308. Although not shown, subsequent to step 304, the client compares the hash function value provided in step 304 to a second hash function value determined by the client. In the case of system 100 of FIG. 1A, the second hash function value is also determined via the process of FIG. 2. If the client's comparison of the two hash function values determines that they are unequal, then the client or server initiates a recovery process (e.g., requests a re-transfer of file 110 of FIG. 1A).

5 Example

FIG. 4 is a table 400 that includes an example of changes in the contents of a file transfer buffer as a result of the process of FIG. 2, in accordance with embodiments of the present invention. As one example, assume that file 110 (see FIG. 1A) consists solely of the following characters, which include alphabetic characters and the space character:

The quick brown fox jumps over the lazy dog

In this example, the size of file transfer buffer 112 (see FIG. 1A) is 12 characters. During the first iteration of steps 208, 210, 212 and 214 of FIG. 2, file transfer buffer 112 (see FIG. 1A) is loaded with the first 12 characters of file 110 (see FIG. 1A):

The quick br

Program 108 (see FIG. 1A) computes the hash function value for buffer 112 (see FIG. 1A) as 166301612 and stores the hash function value in hash value storage 114 (see FIG. 1A). The hash function value for the aforementioned first iteration is shown in the cumulative hash value column of table 400.

In the second iteration of steps 208, 210, 212 and 214 of FIG. 2, file transfer buffer 112 is loaded with the next 12 characters of file 110 (see FIG. 1A):

own fox jump

Program 108 (see FIG. 1A) updates the cumulative hash value using the current contents of buffer 112 (see FIG. 1A) (i.e., using own fox jump). The updated cumulative hash function value for the second iteration is 2388230324, as shown in the cumulative hash value column of table 400.

The updating of the cumulative hash function value continues for a third and fourth iteration of steps 208, 210, 212 and 214 of FIG. 2 (i.e., until the entire contents of file 110 of FIG. 1A is processed by program 108 of FIG. 1A), as shown in table 400. After the fourth iteration, step 210 of FIG. 210 detects the end of the transfer of file 110. The cumulative hash function value known by program 108 (see FIG. 1A) at the end of the transfer of file 110 (see FIG. 1A) (i.e., cumulative hash value 1095738169 in table 400) may then be used, for example, by computing system 104 (see FIG. 1A) to validate the transfer of file 110 (see FIG. 1A).

If interim cumulative hash values of table 400 are stored in persistent storage, a failed file transfer may be restarted between sessions from the last processed buffer contents to recompute the hash value at the restart state without requiring a reprocessing of other previous buffer contents.

6 Computing System

Figure 5:
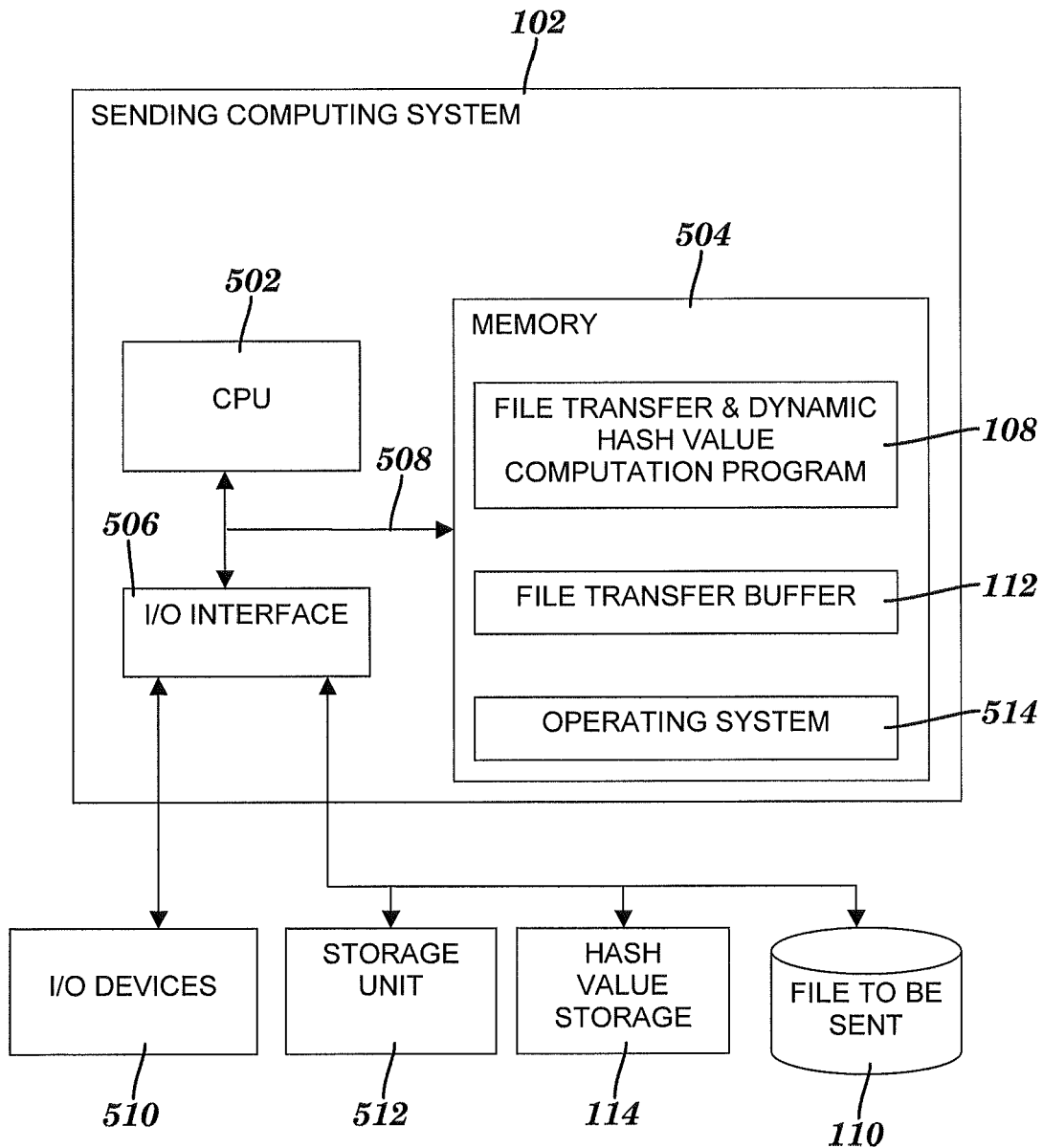
FIG. 5 is a block diagram of a computing system included in the system of FIG. 1A or 1C and that implements the process of FIG. 2, in accordance with embodiments of the present invention.

FIG. 5 is a block diagram of a computing system included in the system of FIG. 1A or 1C and that implements the process of FIG. 2, in accordance with embodiments of the present invention. Although FIG. 5 includes sending computing system 102, the functional descriptions in this section may also be applied to the analogous components of receiving computing unit 104 of FIG. 1A or 1B. Sending computing system 102 generally comprises a central processing unit (CPU) 502, a memory 504, an input/output (I/O) interface 506, a bus 508, I/O devices 510, storage unit 512, hash value storage 114 and data file 110. CPU 502 performs computation and control functions of computing unit 102. CPU 502 may comprise a single processing unit, or be distributed across one or more processing units in one or more locations (e.g., on a client and server).

Memory 504 may comprise any known type of data storage and/or transmission media, including bulk storage, magnetic media, optical media, random access memory (RAM), read-only memory (ROM), a data cache, a data object, etc. Cache memory elements of memory 504 provide temporary storage of at least some program code (e.g., file transfer & dynamic hash value computation program 108) in order to reduce the number of times code must be retrieved from bulk storage during execution. Moreover, similar to CPU 502, memory 504 may reside at a single physical location, comprising one or more types of data storage, or be distributed across a plurality of physical systems in various forms (e.g., Network Attached Storage (NAS), Storage Area Networks (SANs), external drives, etc.). Further, memory 504 can include data distributed across, for example, a LAN, WAN or SAN (not shown).

I/O interface 506 comprises any system for exchanging information to or from an external source. I/O devices 510 comprise any known type of external device, including a pointing device 106 (e.g., a mouse), a display monitor, keyboard, printer, speakers, handheld device, facsimile, network device (e.g., hub, router, or switch), etc. Bus 508 provides a communication link between each of the components in computing system 102, and may comprise any type of transmission link, including electrical, optical, wireless, etc.

I/O interface 506 also allows computing system 102 to store and retrieve information (e.g., program instructions or data) from auxiliary storage device 512, hash value storage 114, and file 110. In one embodiment, storage device 512 and hash value storage 114 may be a single storage unit. In one embodiment, storage device 512 may include file 110. The auxiliary storage device 512 and hash value storage 114 may be non-volatile storage devices such as magnetic disk drives or optical disk drives (e.g., a CD-ROM drive which receives a CD-ROM disk). Computing system 102 can store and retrieve information from other auxiliary storage devices (not shown), which can include a direct access storage device (DASD) (e.g., hard disk or floppy diskette), a magneto-optical disk drive, a tape drive, or a wireless communication device.

Memory 504 includes file transfer & dynamic hash value computation program 108 and file transfer buffer 112. The functionalities of program 108 and buffer 112 are described above relative to FIGS. 1A and 2. Program 108 in memory 504 implements the steps of the processes of FIGS. 2 and 3. Further, memory 504 includes an operating system 514 (e.g., Linux) that runs on CPU 502 and provides control of various components within and/or connected to computing system 102. Other systems not shown in FIG. 5 may also be included in memory 504.

The invention, including file transfer & dynamic hash value computation program 108, can take the form of an entirely hardware embodiment, an entirely software embodiment or an embodiment containing both hardware and software elements. In a preferred embodiment, program 108 is implemented in software, which includes but is not limited to firmware, resident software, microcode, etc., and which can be loaded into computing system 102 from a computer-readable medium.

Furthermore, the invention can take the form of a computer program product accessible from a computer-usable or computer-readable medium providing program code of program 108 for dynamically determining hash values for file transfer integrity validation for use by or in connection with a computing system 102 or any instruction execution system to provide and facilitate the capabilities of the present invention. The aforementioned computer-usable or computer-readable medium or another computer-usable or computer-readable medium may provide program code for file transfer & dynamic hash value computation program 108. For the purposes of this description, a computer-usable or computer-readable medium can be any apparatus that can contain, store, communicate, propagate, or transport the program 108 for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 504, ROM, a rigid magnetic disk and an optical disk. Current examples of optical disks include compact disk-read-only memory (CD-ROM), compact disk-read/write (CD-R/W) and DVD.

Any of the components of the present invention can be deployed, managed, serviced, etc. by a service provider that offers to deploy or integrate computing infrastructure with respect to the present invention's process of dynamically determining hash values for file transfer integrity validation. Thus, the present invention discloses a process for supporting computer infrastructure, comprising integrating, hosting, maintaining and deploying computer-readable code into a computing system (e.g., computing system 102), wherein the code in combination with the computing system is capable of performing a method of dynamically determining hash values for file transfer integrity validation.

In another embodiment, the invention provides a business method that performs the process steps of the invention on a subscription, advertising and/or fee basis. That is, a service provider, such as a Solution Integrator, can offer to create, maintain, support, etc. a process of the present invention that includes dynamically determining hash values for file transfer integrity validation. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of dynamically determining hash values for file transfer integrity validation, comprising:

a first computing system loading a first portion of a data file to a file transfer buffer of said first computing system, wherein said loading said first portion is performed in response to a request for a transfer of said data file between said first computing system and a second computing system;

said first computing system determining a first hash function value in response to said loading said first portion, wherein said first hash function value is based on said first portion;

responsive to said request for said transfer, said first computing system loading a second portion of said data file to said file transfer buffer; and responsive to said loading said second portion, said first computing system determining a second hash function value incrementally based on an accumulation of portions of said data file previously loaded to said file transfer buffer in response to said request for said transfer, wherein said accumulation of portions includes said first portion and said second portion, wherein said first portion and said second portion are non-overlapping portions included in a plurality of non-overlapping portions comprising said data file.

2. The method of claim 1, further comprising:

said first computing system receiving said request for said transfer of said data file;

said first computing system sending said first portion of said data file to said second computing system; and said first computing system sending said second portion of said data file to said second computing system.

3. The method of claim 2, further comprising:
said first computing system fetching said first portion of said data file from a persistent storage coupled to said first computing system; and
said first computing system fetching said second portion of said data file from said persistent storage,
wherein said loading said first portion of said data file is performed subsequent to said fetching said first portion of said data file, and
wherein said loading said second portion of said data file is performed subsequent to said fetching said second portion of said data file.

4. The method of claim 2, further comprising:
in response to said receiving said request, said first computing system successively loading any other portions of said plurality of non-overlapping portions of said data file to said file transfer buffer;
said first computing system determining a final hash function value in response to said successively loading said any other portions, wherein said final hash function value is based on said plurality of non-overlapping portions;
subsequent to said successively loading said any other portions, said first computing system detecting an end of said data file; and
in response to said detecting said end of said data file, said first computing system storing said final hash function value in a hash value storage coupled to said first computing system.

5. The method of claim 1, further comprising:
said first computing system sending said request for said transfer of said data file;
said first computing system receiving said first portion of said data file from said second computing system; and
said first computing system receiving said second portion of said data file from said second computing system.

6. The method of claim 5, further comprising:
said first computing system fetching said first portion of said data file from a persistent storage coupled to said first computing system; and
said first computing system fetching said second portion of said data file from said persistent storage,
wherein said loading said first portion of said data file is performed subsequent to said fetching said first portion of said data file, and
wherein said loading said second portion of said data file is performed subsequent to said fetching said second portion of said data file.

7. The method of claim 5, further comprising:
subsequent to said sending said request, said first computing system successively loading any other portions of said plurality of non-overlapping portions of said data file to said file transfer buffer;
said first computing system determining a final hash function value in response to said successively loading said any other portions, wherein said final hash function value is based on said plurality of non-overlapping portions;
subsequent to said successively loading said any other portions, said first computing system detecting an end of said data file; and
in response to said detecting said end of said data file, said first computing system storing said final hash function value in a hash value storage coupled to said first computing system.

8. The method of claim 1, further comprising:
said second computing system loading said first portion of said data file to a file transfer buffer of said second computing system;
said second computing system determining a third hash function value in response to said loading said first portion to said file transfer buffer of said second computing system, wherein said third hash function value is based on said first portion;
said second computing system loading a second portion of said data file to said file transfer buffer of said second computing system; and
said second computing system determining a fourth hash function value in response to said loading said second portion to said file transfer buffer of said second computing system, wherein said fourth hash function value is based on said first portion and said second portion.

9. The method of claim 1, further comprising:
said first computing system storing said first hash function value in a persistent data repository coupled to said first computing system;
subsequent to said storing, said first computing system detecting a failure of a communication session between said first computing system and said second computing system, wherein said failure prevents a completion of said transfer of said data file until said transfer is restarted;
restarting said transfer of said data file subsequent to said detecting;
in response to said restarting, said first computing system obtaining said first hash function value from said persistent data repository,
wherein said determining said second hash function value is performed subsequent to said obtaining said first hash function value from said persistent data repository.

10. A first computing system for dynamically determining hash values for file transfer integrity validation, said first computing system comprising:
a processor;
a computer readable memory;
a computer readable storage medium;
first program instructions to initiate loading a first portion of a data file to a file transfer buffer of said first computing system in response to a request for a transfer of said data file between said first computing system and a second computing system;
second program instructions to determine a first hash function value subsequent to initiating loading said first portion by said first program instructions, wherein said first hash function value is based on said first portion;
third program instructions to initiate loading a second portion of said data file to said file transfer buffer in response to said request for said transfer; and
fourth program instructions to determine a second hash function value incrementally based on an accumulation of portions of said data file previously loaded to said file transfer buffer in response to said request for said transfer, wherein said accumulation of portions includes said first portion and said second portion, wherein determining said second hash function value is performed by said fourth program instructions subsequent to initiating loading said second portion by said third program instructions,
wherein said first portion and said second portion are non-overlapping portions included in a plurality of non-overlapping portions comprising said data file, and wherein said first, second, third and fourth program instructions are stored on said computer readable storage medium and are executable by said processor via said computer readable memory.

11. The first computing system of claim 10, further comprising:
fifth program instructions for receiving said request for said transfer of said data file;
sixth program instructions for sending said first portion of said data file to said second computing system; and
seventh program instructions for sending said second portion of said data file to said second computing system,
wherein said fifth, sixth, and seventh program instructions are stored on said computer readable storage medium and are executable by said processor via said computer readable memory.

12. The first computing system of claim 11, further comprising:
eighth program instructions for fetching said first portion of said data file from a persistent storage coupled to said first computing system; and
ninth program instructions for fetching said second portion of said data file from said persistent storage,
wherein initiating loading said first portion of said data file by said first program instructions is performed subsequent to said fetching said first portion of said data file by said eighth program instructions,
wherein initiating loading said second portion of said data file by said third program instructions is performed subsequent to said fetching said second portion of said data file by said ninth program instructions, and
wherein said eighth and ninth program instructions are stored on said computer readable storage medium and are executable by said processor via said computer readable memory.

13. The first computing system of claim 10, further comprising:
fifth program instructions for sending said request for said transfer of said data file;
sixth program instructions for receiving said first portion of said data file from said second computing system; and
seventh program instructions for receiving said second portion of said data file from said second computing system,
wherein said fifth, sixth, and seventh program instructions are stored on said computer readable storage medium and are executable by said processor via said computer readable memory.

14. The first computing system of claim 13, further comprising:
eighth program instructions for fetching said first portion of said data file from a persistent storage coupled to said first computing system; and
ninth program instructions for fetching said second portion of said data file from said persistent storage,
wherein initiating loading said first portion of said data file by said first program instructions is performed subsequent to said fetching said first portion of said data file by said eighth program instructions,
wherein initiating loading said second portion of said data file by said third program instructions is performed subsequent to said fetching said second portion of said data file by said ninth program instructions, and
wherein said eighth and ninth program instructions are stored on said computer readable storage medium and are executable by said processor via said computer readable memory.

15. A computer program product for dynamically determining hash values for file transfer integrity validation, said computer program product comprising:
a computer readable storage medium;
first program instructions to initiate loading a first portion of a data file to a file transfer buffer of a first computing system, wherein initiating loading said first portion by said first program instructions is performed in response to a request for a transfer of said data file between said first computing system and a second computing system;
second program instructions to determine a first hash function value subsequent to initiating loading said first portion by said first program instructions, wherein said first hash function value is based on said first portion;
third program instructions to initiate loading a second portion of said data file to said file transfer buffer in response to said request for said transfer; and
fourth program instructions to determine a second hash function value incrementally based on an accumulation of portions of said data file previously loaded to said file transfer buffer in response to said request for said transfer, wherein said accumulation of portions includes said first portion and said second portion, wherein determining said second hash function is performed by said fourth program instructions subsequent to initiating loading said second portion by said third program instructions,
wherein said first portion and said second portion are non-overlapping portions included in a plurality of non-overlapping portions comprising said data file, and
wherein said first, second, third, and fourth program instructions are stored on said computer readable storage medium.

16. The program product of claim 15, further comprising:
fifth program instructions to receive said request for said transfer of said data file;
sixth program instructions to send said first portion of said data file to said second computing system; and
seventh program instructions to send said second portion of said data file to said second computing system,
wherein said fifth, sixth, and seventh program instructions are stored on said computer readable storage medium and are executable by said first computing system.

17. The program product of claim 16, further comprising:
eighth program instructions to fetch said first portion of said data file from a persistent storage coupled to said first computing system; and
ninth program instructions to fetch said second portion of said data file from said persistent storage,
wherein initiating loading said first portion of said data file by said first program instructions is performed subsequent to fetching said first portion of said data file by said eighth program instructions,
wherein initiating loading said second portion of said data file by said third program instructions is performed subsequent to fetching said second portion of said data file by said ninth program instructions, and
wherein said eighth and ninth program instructions are stored on said computer readable storage medium and are executable by said first computing system.

18. The program product of claim 15, further comprising:
fifth program instructions to send said request for said transfer of said data file;
sixth program instructions to receive said first portion of said data file from said second computing system; and
seventh program instructions to receive said second portion of said data file from said second computing system, wherein said fifth, sixth, and seventh program instructions are stored on said computer readable storage medium and are executable by said first computing system.

19. The program product of claim 18, further comprising:
eighth program instructions to fetch said first portion of said data file from a persistent storage coupled to said first computing system; and
ninth program instructions to fetch said first portion of said data file from said persistent storage,
wherein initiating loading said first portion of said data file by said first program instructions is performed subsequent to fetching said first portion of said data file by said eighth program instructions,
wherein initiating loading said second portion of said data file by said third program instructions is performed subsequent to fetching said second portion of said data file by said ninth program instructions,
wherein said eighth and ninth program instructions are stored on said computer readable storage medium and are executable by said first computing system.

20. The program product of claim 15, wherein said program product further comprises:
fifth program instructions to initiate loading said first portion of said data file to a file transfer buffer of said second computing system;
sixth program instructions to determine a third hash function value subsequent to initiating loading said first portion to said file transfer buffer of said second computing system by said fifth program instructions, wherein said third hash function value is based on said first portion;
seventh program instructions to initiate loading a second portion of said data file to said file transfer buffer of said second computing system; and
eighth program instructions to determine a fourth hash function value subsequent to initiating loading said second portion to said file transfer buffer of said second computing system by said seventh program instructions, wherein said fourth hash function value is based on said first portion and said second portion, and
wherein said fifth, sixth, seventh, and eighth program instructions are stored on said computer readable storage medium and are executable by said second computing system.

* * * * *